UNITED STATES PATENT OFFICE.

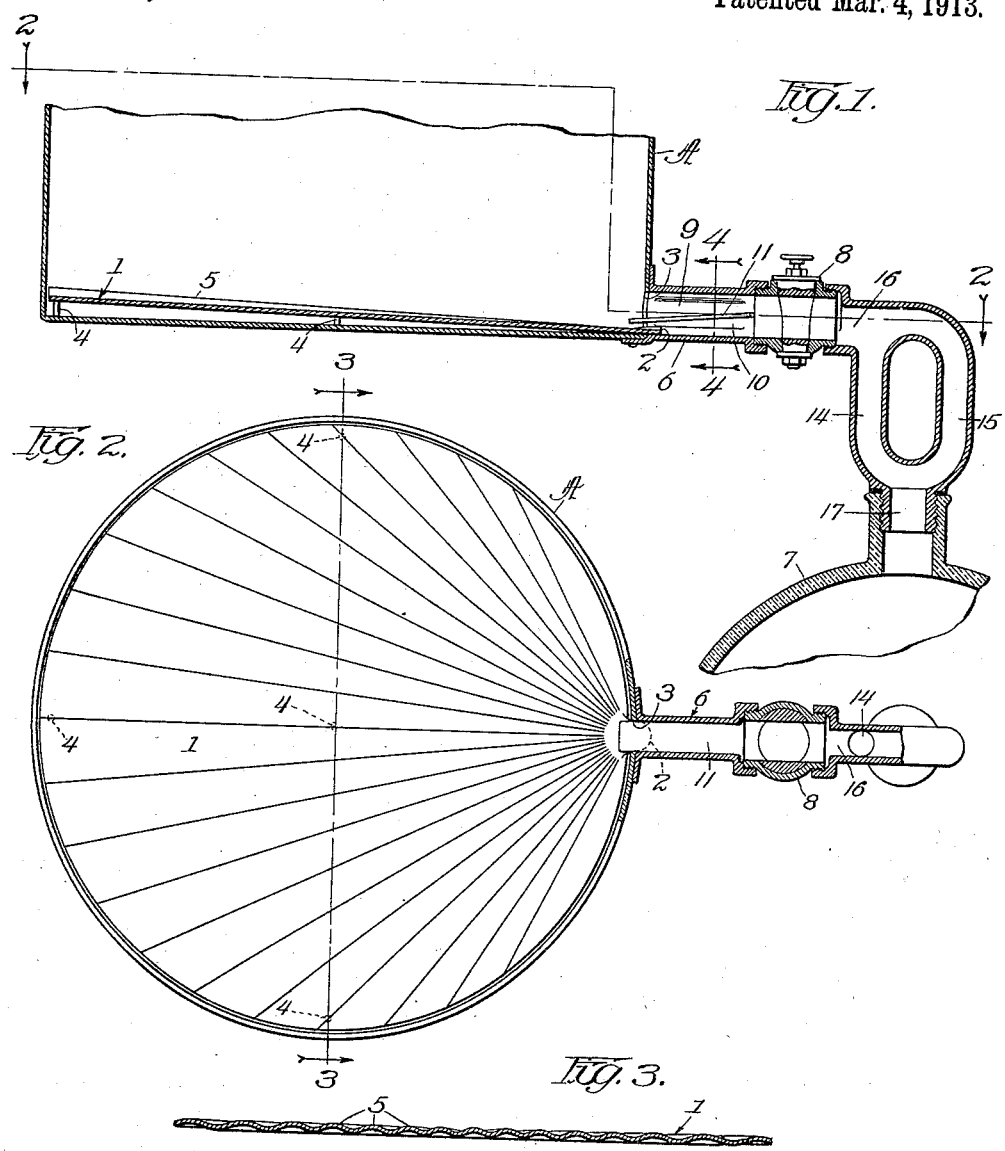

ANTON F. CHERNEY, OF CHICAGO, ILLINOIS, ASSIGNOR OF ONE-HALF TO GEORGE LANDIS WILSON, OF OAK PARK, ILLINOIS.

COOKING UTENSIL.

1,054,745.      Specification of Letters Patent.      Patented Mar. 4, 1913.

Application filed October 9, 1911. Serial No. 653,680.

*To all whom it may concern:*

Be it known that I, ANTON F. CHERNEY, a citizen of the United States, and a resident of Chicago, in the county of Cook and State of Illinois, have invented a certain new and useful Cooking Utensil, of which the following is a specification.

This invention relates to cooking utensils and relates particularly to utensils for cooking in lard or other grease, as for frying doughnuts and other products in a bath of hot lard or other hot grease.

The object of the invention is to provide a utensil for this purpose so constructed and arranged that, in use, sediment and other physical impurities contained in or which may accumulate in the lard or other grease will be separated therefrom, thus automatically clarifying the lard or other grease and maintaining it in a pure and wholesome condition.

To this end, a utensil of my invention comprises the various features and details of construction hereinafter described and claimed.

In the accompanying drawing in which my invention is fully illustrated,—Figure 1 is a vertical sectional view of my improved utensil, through the settling trap and drain connections. Fig. 2 is a top plan view thereof, partly in section on the line 2—2 of Fig. 1. Fig. 3 is a sectional view of the removable false bottom, on the line 3—3 of Fig. 2; and Fig. 4 is a sectional detail on the line 4—4 of Fig. 1.

Referring now to the drawing, A designates a vessel suitable for use in frying articles in a bath of hot grease, as for frying doughnuts in lard. As regards its usual features, said vessel A may be of any desired or approved construction and will be readily understood without a detailed description thereof.

Supported in slightly inclined position within the vessel A, and closely adjacent to the bottom thereof, is a removable false bottom 1, preferably made of suitable sheet metal, formed on the lower side of which is a spout 2 which enters a discharge opening 3 in the side wall of the vessel A. As shown, the false bottom 1, is supported by legs 4 which rest on the bottom of the vessel A, said legs being of such length that the spout 2 will rest on the lower side of the discharge opening 3, so that, when said false bottom 1 is in position, said discharge opening 3 will communicate with said vessel A above said false bottom. The false bottom 1 is provided with corrugations 5 which converge to the spout 2, said corrugations becoming gradually shallower toward said spout and "running out" substantially at the inner end thereof.

Rigidly secured to the vessel A in communication with the discharge opening 3 therein is a drain pipe 6 the outer end of which turns down, and detachably secured to the outer end thereof is a receptacle 7, preferably a glass flask or bottle. As shown said receptacle 7 is secured to said pipe by means of screw threads, thus providing for conveniently attaching and disconnecting said receptacle.

The drain pipe 6 is controlled by a stop cock or valve 8 and, adjacent to the vessel A, is divided into separate upper and lower passages 9 and 10 by a longitudinal web 11, the inner end of which projects a short distance, say one inch through the discharge opening 3 into the vessel A. Said web 11 is preferably made of light sheet metal, as thin copper, and is pivoted at its outer end at about the center, vertically, of the drain pipe, so that its inner end will be free to raise and lower to vary the size of the discharge opening from the vessel A into the lower passage 10 defined by said web. The normal position of said web 11, when the grease is cold, is downwardly and inwardly inclined at an angle such that the size of the opening from the vessel A into the lower passage 10 will be about ⅓ the area of the pipe 6. The operation of said web to vary the size of the opening from said vessel A into the lower passage 10 will be automatic, the upward circulation of the grease in the vessel A, as the temperature thereof increases, operating to raise said web to increase the size of said opening, and the end of said web falling as the grease cools and the circulation decreases, thus reducing the operating size of said passage. To provide for desired pivotal movement of said web 11 the lateral sides of said pipe 6, in which said web is mounted, are made flat and substantially parallel, as shown at 12, Fig. 4, and movement of said web is limited by suitable stops, consisting, as shown, of the shoulders 13 at the upper and lower edges of said flat surfaces 12, In the preferable construction shown, the vertical section of the pipe 6 comprises separate passageways 14 and 15 which join at their upper and lower ends and terminate in single passageways 16 and 17 respectively. The receptacle 7 forms in effect a settling trap and for purposes of convenient reference will be so designated in the claims.

The vessel A being filled with lard or other grease to a desired level and heat applied to the bottom of said vessel, the operation of my improved apparatus is as follows:—As the grease in the vessel A becomes warm it becomes thinner and more liquid and sediment or other physical impurities contained therein or which may accumulate therein will settle upon the false bottom and, owing to the inclination thereof and the circulation of the hot grease will gradually work down said inclined false bottom toward the lower side thereof. Obviously as the sediment deposited upon the false bottom 1 passes along the same, it will be guided by the grooves or corrugations 5 to the spout 2, through the drain pipe and into the trap 7, where it settles and remains. Movement of the sediment and other physical impurities into and through the drain pipe 6 is facilitated by the web 11 and particularly by the end of said web which projects into the vessel A and which will operate in an obvious manner to divert the circulating hot grease into and through the lower passage 10 of said drain pipe 6, thus creating an outward current along the lower passage 10 and a return current inwardly along the upper passage 9 of said drain pipe. As the grease becomes hotter and the circulation more rapid, the free end of the web 11 will rise, thus increasing the operative size of the lower passage 10 and correspondingly retarding the velocity of the current so that the impurities in the grease passing through said drain pipe will deposit. When it is desired to empty said receptacle 7, the stop cock 8 is closed, said receptacle disconnected, emptied, cleansed, if desired, replaced and the stop cock 8 opened.

With the described construction and operation, it is obvious that in use, the grease will be automatically clarified and kept pure and wholesome all in the manner desired.

I claim:

1. A cooking utensil comprising a vessel, a removable false bottom supported in inclined position within said vessel, a settling trap and drain connection from the lower side of the upper surface of said false bottom to said trap, substantially as described.

2. A cooking utensil comprising a vessel, a removable false bottom support in inclined position within said vessel, a settling trap and drain connection from the lower side of the upper surface of said false bottom to said trap, said drain connection comprising a controlled pipe which connects said trap with said vessel above said false bottom and a spout on said false bottom which extends into said pipe, substantially as described.

3. A cooking utensil comprising a vessel, a removable false bottom supported in inclined position within said vessel, a settling trap and drain connection from the lower side of the upper surface of said false bottom to said trap, said drain connection comprising a controlled pipe which connects said trap with said vessel, and a web in said pipe which divides the same into upper and lower passages, substantially as described.

4. A cooking utensil comprising a vessel, a removable false bottom supported in inclined position within said vessel, a settling trap and drain connection from the lower side of the upper surface of said false bottom to said trap, said drain connection comprising a controlled pipe which connects said trap with said vessel, and a web in said pipe which divides the same into upper and lower passages, the inner end of said web projecting inwardly beyond said pipe into said vessel, substantially as described.

5. A cooking utensil comprising a vessel, a removable false bottom supported in inclined position within said vessel, a settling trap and drain connection from the lower side of the upper surface of said false bottom to said trap, said drain connection comprising a controlled pipe which connects said trap with said vessel, and a web of thin sheet metal in said pipe which divides the same into upper and lower passages, said web being pivoted at its ends remote from said vessel and stops which limit the pivotal movement of said web to define a minimum and maximum size of said lower passage, substantially as described.

6. A cooking utensil comprising a vessel, a removable false bottom supported in inclined position within said vessel, a settling trap and drain connection from the lower side of the upper surface of said false bottom to said trap, said drain connection comprising a pipe which connects said trap with said vessel, said pipe comprising a vertical section provided with separate passageways, substantially as described.

7. A cooking utensil comprising a vessel, a removable false bottom supported in inclined position within said vessel, a settling trap and drain connection from the lower side of the upper surface of said false bottom to said trap, said false bottom being provided with grooves or corrugations which converge toward the admission opening to said drain connection, substantially as described.

8. A cooking utensil comprising a vessel, a removable false bottom supported in inclined position within said vessel, a settling trap and drain connection from the lower side of the upper surface of said false bottom to said trap, said false bottom being provided with grooves or corrugations which converge toward the admission opening to said drain connection, and which become gradually shallower toward and "run-out" substantially at the point of discharge from said false bottom, substantially as described.

9. A cooking utensil comprising a vessel, a removable false bottom supported in inclined position within said vessel, a settling trap and drain connection from the lower side of the upper surface of said false bottom to said trap, said drain connection comprising a controlled pipe which connects said trap with said vessel above said false bottom and a spout on said false bottom which extends into said pipe, said false bottom being provided with grooves or corrugations which converge toward the spout thereon, substantially as described.

10. A cooking utensil comprising a vessel, a removable false bottom supported in inclined position within said vessel, a settling trap and drain connection from the lower side of the upper surface of said false bottom to said trap, said drain connection comprising a controlled pipe which connects said trap with said vessel above said false bottom and a spout on said false bottom which extends into said pipe, said false bottom being provided with grooves or corrugations which converge toward the spout thereon and which become gradually shallower toward and "run-out" substantially at said spout, substantially as described.

In testimony, that I claim the foregoing as my invention, I affix my signature in presence of two subscribing witnesses, this 4th day of October A. D., 1911.

ANTON F. CHERNEY.

Witnesses:
S. J. DORAIS,
M. C. ALLEN.

---

Copies of this patent may be obtained for five cents each, by addressing the "Commissioner of Patents, Washington, D. C."